(12) United States Patent
Suzuki (10) Patent No.: US 9,551,285 B2
(45) Date of Patent: Jan. 24, 2017

(54) EXHAUST GAS CONTROL DEVICE OF GAS ENGINE

(71) Applicant: Mitsubishi Heavy Industries, Ltd., Tokyo (JP)

(72) Inventor: Hajime Suzuki, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 14/777,432

(22) PCT Filed: Feb. 20, 2014

(86) PCT No.: PCT/JP2014/054052
§ 371 (c)(1),
(2) Date: Sep. 15, 2015

(87) PCT Pub. No.: WO2014/148192
PCT Pub. Date: Sep. 25, 2014

(65) Prior Publication Data
US 2016/0047323 A1  Feb. 18, 2016

(30) Foreign Application Priority Data
Mar. 19, 2013  (JP) ................. 2013-056775

(51) Int. Cl.
*F01N 3/00*  (2006.01)
*F02D 37/02*  (2006.01)
(Continued)

(52) U.S. Cl.
CPC ............ *F02D 37/02* (2013.01); *F01N 3/206* (2013.01); *F01N 9/00* (2013.01); *F02D 19/02* (2013.01);
(Continued)

(58) Field of Classification Search
CPC .......... F02D 37/02; F02D 19/02; F01N 3/206; F01N 9/00; F02P 9/002; F02P 5/1502; F02M 21/02
(Continued)

(56) References Cited

U.S. PATENT DOCUMENTS

2013/0014728 A1\* 1/2013 Ozaki ................. F02B 43/10
                                                          123/25 A
2013/0055712 A1\* 3/2013 Shimizu ............. F02B 19/1004
                                                             60/602

FOREIGN PATENT DOCUMENTS

EP         2405120 A1    3/2010
JP       H08121201 A     5/1996
(Continued)

OTHER PUBLICATIONS

English translation of Japanese Patent Application Publication No. JP 2002-309986 A (Oct. 2002).\*
(Continued)

*Primary Examiner* — Jason Shanske
(74) *Attorney, Agent, or Firm* — Berkeley Law & Technology Group, LLP (57) ABSTRACT

An object is to provide an exhaust-gas control device for a gas engine whereby NOx is reduced and fuel consumption is improved by performing NOx restriction operation when an environmental or geographical condition in which the amount of NOx emission needs to be temporarily restricted is satisfied, and otherwise performing stable operation focusing on the fuel consumption. The exhaust-gas control device for a gas engine includes: a basic operation mode unit (80) using the first target ignition timing and the first target air-fuel rate at which the fuel consumption rate is the optimum; a low-NOx operation mode unit (82) using the second target ignition timing retarded from the first target ignition timing and the second target air-fuel rate increased
(Continued)

from the first target air-fuel rate; a NOx reduction demand determination unit (86) for determining whether to restrict the amount of NOx emission temporarily, and an switching unit to operation mode (84) for switching the operation mode to the low NOx operation mode while the reduction demand condition is satisfied by the NOx reduction demand determination unit.

6 Claims, 9 Drawing Sheets

(51) Int. Cl.
| | |
|---|---|
| *F02M 21/02* | (2006.01) |
| *F02D 19/02* | (2006.01) |
| *F02D 23/00* | (2006.01) |
| *F02P 5/04* | (2006.01) |
| *F02P 5/15* | (2006.01) |
| *F01N 3/20* | (2006.01) |
| *F01N 9/00* | (2006.01) |
| *F02D 41/02* | (2006.01) |
| *F02P 9/00* | (2006.01) |
| *F02D 41/00* | (2006.01) |
| *F02P 13/00* | (2006.01) |
| *F02D 19/06* | (2006.01) |
| *F02B 19/12* | (2006.01) |

(52) U.S. Cl.
CPC ........... *F02D 23/00* (2013.01); *F02D 41/0027* (2013.01); *F02D 41/0235* (2013.01); *F02M 21/02* (2013.01); *F02P 5/045* (2013.01); *F02P 5/1502* (2013.01); *F02P 9/002* (2013.01); *F02B 19/12* (2013.01); *F02D 19/0673* (2013.01); *F02D 41/0025* (2013.01); *F02D 2200/0414* (2013.01); *F02D 2200/0418* (2013.01); *F02D 2200/70* (2013.01); *F02D 2200/701* (2013.01); *F02D 2250/36* (2013.01); *F02M 21/023* (2013.01); *F02P 13/00* (2013.01); *Y02T 10/36* (2013.01); *Y02T 10/46* (2013.01)

(58) Field of Classification Search
USPC .......................................................... 60/285
See application file for complete search history.

(56) References Cited

FOREIGN PATENT DOCUMENTS

| | | |
|---|---|---|
| JP | H11351047 A | 12/1999 |
| JP | 2001107809 A | 4/2001 |
| JP | 2002309986 A | 10/2002 |
| JP | 2003148187 A | 5/2003 |
| JP | 2003239748 A | 8/2003 |
| JP | 2005188369 A | 7/2005 |
| JP | 2005226621 A | 8/2005 |
| JP | 4026991 B2 | 12/2007 |
| JP | 2009144626 A | 7/2009 |
| JP | 2009144627 A | 7/2009 |
| JP | 2009144628 A | 7/2009 |
| JP | 2010007518 A | 1/2010 |
| JP | 2011127544 A | 6/2011 |
| JP | 2011247238 A | 12/2011 |
| JP | 2013024047 A | 2/2013 |
| WO | 2006039452 A2 | 4/2006 |
| WO | 2010070199 A1 | 6/2010 |
| WO | 2011125976 A1 | 10/2011 |
| WO | 2014148192 A1 | 9/2014 |

OTHER PUBLICATIONS

Notification Concerning Submission, Obtention or Transmittal of Priority Document, App. No. PCT/JP2014/054052, Filed Feb. 20, 2014, Mailed Apr. 9, 2014, 1 Page.
Notification of Transmittal of Translation of the International Preliminary Report on Patentability, App. No. PCT/JP2014/054052, Filed Feb. 20, 2014, Mailed Oct. 1, 2015, 16 Pages.
International Search Report, App. No. PCT/JP2014/054052, Filed Feb. 20, 2014, Mailed Mar. 18, 2014, 13 Pages.
Decision to Grant a Patent, App. No. JP2013-056775, Drafting Date Jun. 24, 2016, Mailing Date Jul. 1, 2016, 6 Pages.
Extended European Search Report, App. No. 14767698.5, Mailed Nov. 24, 2016, 7 Pages.

* cited by examiner

EXHAUST GAS CONTROL DEVICE OF GAS ENGINE

TECHNICAL FIELD

The present invention relates to an exhaust-gas purification device for a gas engine. It especially relates to an exhaust-gas control device which is effective in restricting emission of NOx (nitrogen oxide) of a gas engine for a stationary generator or a ship.

BACKGROUND

It is known that there is a trade-off relationship between the amount of NOx emission from an engine and the fuel consumption rate. It is desirable to operate the engine so as to reduce the fuel consumption rate while satisfying a NOx regulation value.

To restrict production of NOx, it is effective to control the ignition timing and the air-fuel ratio. For instance, Patent Document 1 (JP2003-148781A) discloses restricting knocking and production of NOx upon a change in fuel composition for a gas engine supplied with fuel with variable composition by controlling the ignition timing and the fuel-air ratio of the gas engine in accordance with the output of a fuel-composition measurement unit, a load measurement unit, and an engine speed measurement unit.

CITATION LIST

Patent Literature

Patent Document 1: JP2003-148187A

SUMMARY

Problems to be Solved

While Patent Document 1 discloses restriction of the amount of NOx emission upon a change in the fuel composition of the gas engine, the disclosure does not cover restriction of the amount of NOx emission based on the environmental state or the geographical state in which restriction of the amount of NOx emission is required.

Specifically, the environmental conditions or the geographical conditions in which the amount of NOx emission is required to be restricted temporarily are the following cases, for instance: a case where a smog alert is issued during summer in an urban area, and it is necessary to temporarily restrict NOx which causes generation of photochemical smog; a case where NOx is to be temporarily restricted until execution of maintenance during a period in which an engine operation period approaches a predetermined maintenance time and deterioration in the exhaust-gas concentration is predicted; a case where the ambient environmental condition is such that the temperature is high and the humidity is low, which increases the combustion temperature; and a case where an engine for e.g. a ship or a moving body enters a region or a nation where NOx is regulated, and NOx needs to be temporarily restricted.

If a facility or a control of for addressing such temporary need for NOx restriction is always provided or operated at a high level, it may lead to deterioration in the fuel consumption rate of the engine or an increase in the installation cost.

In this regard, if NOx-restriction operation is performed temporarily, it is possible to prevent deterioration in the fuel consumption and an increase in the installation cost as compared to a case where NOx-restriction operation is performed constantly, which is economically efficient.

In a gas engine for a generator in particular, in order to restrict NOx, it is necessary to provide an expensive denitration facility and to operate the gas engine while restricting the power generation output. Thus, temporary restriction operation is effective in maintaining the power generation output at a constant rate and in restricting deterioration in the fuel consumption of the gas engine.

In view of the above technical issues, an object of the present invention is to provide an exhaust-gas control device for a gas engine whereby NOx is reduced and fuel consumption is improved by performing NOx-restriction operation when environmental or geographical conditions in which temporary restriction of the amount of NOx emission is required are satisfied, and otherwise performing stable operation focusing on the fuel consumption.

Solution to Problems

To achieve the above object, the present invention provides an exhaust-gas control device for a gas engine which mixes fuel gas and air and supplies mixed gas to a combustion chamber. The exhaust-gas control device includes: an ignition-timing control unit configured to control an ignition timing of the mixed gas supplied into the combustion chamber; an air-fuel rate control unit configured to control an air-fuel rate in the combustion chamber; a basic operation mode unit configured to control the ignition-timing control unit and the air-fuel rate control unit having a first target ignition timing and a first target air-fuel rate as target values which are set as an ignition timing and an air-fuel rate at which a fuel consumption rate is optimum on the basis of an engine speed and an engine load; a NOx reduction demand determination unit configured to determine whether to restrict an amount of NOx emission temporarily, on the basis of at least one of an environmental condition, a geographical condition, or an engine operation elapse condition; a low NOx operation mode unit configured to control the ignition-timing control unit and the air-fuel rate control unit having a second target ignition timing retarded from the first target ignition timing and a second target air-fuel rate increased from the first target air-fuel rate as target values; and an switching unit to operation mode configured to switch an operation mode to the low NOx operation mode and continue the low NOx operation mode until a NOx reduction demand is canceled when a reduction demand is issued by the NOx reduction demand determination unit, and to switch the operation mode to the basic operation mode when the NOx reduction demand is canceled.

According to the present invention, only when it is required to restrict the amount of NOx emission temporarily due to at least one of an environmental condition, a geographical condition, or an engine-operation elapse condition, the switching unit to operation mode switches the operation mode to the low NOx operation mode, so that the air-fuel rate control unit performs control based on the second target air-fuel rate increased from the first target excess rate, and the ignition-timing control unit performs control based on the second target ignition timing retarded from the first target ignition timing.

Accordingly, it is possible to obtain an exhaust gas control device for a gas engine whereby it is not necessary to increase the target air-fuel rate and retard the ignition continuously to perform NOx reduction operation, and stable operation is performed focusing on the fuel consumption when not needed, which makes it possible to reduce NOx and improve fuel consumption.

Further, preferably in the present invention, the NOx reduction demand determination unit may be configured to determine that there is a necessity when a photochemical smog alert is issued in an area in which the gas engine is installed or in a vicinity of the area.

With the above configuration, if a smog alert is issued especially during summer in an urban area, it is possible to achieve the effect to reduce NOx efficiently without accompanying deterioration in fuel consumption throughout the entire operation (the entire operation period), by temporarily switching to the low NOx operation mode and performing the NOx reduction operation to reduce the amount of NOx emission which is the cause of production of the photochemical smog.

Further, preferably in the present invention, the NOx reduction demand determination unit may determine that there is a necessity when a high-temperature and low-humidity condition that an ambient temperature in which the gas engine is installed is a predetermined value or more and a humidity is a predetermined value or less is satisfied.

With the above configuration, in a high-temperature and low-humidity state in which the ambient temperature is a predetermined value or more and the humidity is a predetermined value or less, the temperature of the supply air increases, and thus NOx is likely to be produced. Thus, it is possible to obtain the effect to reduce NOx efficiently by switching to the low NOx operation mode and performing the NOx reduction operation temporarily.

As a condition of a high temperature and a low humidity, for instance, the temperature is 30° C. or more and the relative humidity is 40% or less.

Further, preferably in the present invention, the NOx reduction demand determination unit may determine that there is a necessity when a predetermined period before a next maintenance time elapses, or a predetermined period after a start of first operation elapses, on the basis of operation-time data of the gas engine.

The exhaust gas condition tends to become deteriorated immediately before the maintenance time when a component of a gas engine is replaced, for instance. Also, the exhaust gas condition tends to become deteriorated when a predetermined time passes after a start of the first operation, regardless of the maintenance time. Thus, at such a time that is immediately before the maintenance time or when a predetermined time passes after a start of the first operation, it is possible to achieve the effect to reduce NOx efficiently by switching to the low NOx operation mode and performing NOx reduction operation.

Further, preferably in the present invention, the NOx reduction demand determination unit may determine that there is a necessity when a moving body equipped with the gas engine approaches or enters a region where the amount of NOx emission is regulated.

With the above configuration, in a case where the gas engine is a power source for a generator mounted to a vehicle or a ship that is a moving body, or in a case where the gas engine is used as a main power source of a vehicle or a ship that is a moving body, it is possible to achieve the effect to reduce NOx efficiently by switching to the low NOx operation mode to perform NOx reduction operation temporarily when the moving body approaches or enters a region where the amount of NOx emission is regulated.

Further, preferably in the present invention, the gas engine includes a turbocharger, and the low NOx operation mode unit may control the turbocharger so as to increase the air-fuel rate.

With the above configuration, the waste gate flow amount of a turbocharger is controlled to increase the amount of turbocharge, which makes it possible to increase the excess air ratio. In this way, it is possible to enable NOx reduction operation.

Accordingly, in a gas engine with a turbocharger, it is possible to obtain the effect to reduce NOx efficiently by switching to the low NOx operation mode and performing the NOx reduction operation temporarily.

Further, preferably in the present invention, the gas engine may have a pilot-injection type combustion-chamber structure, and the air-fuel rate may be increased in the low NOx operation mode by reducing pilot fuel which is injected into a precombustion chamber or a main chamber.

With the above configuration, it is possible to increase the air-fuel ratio by reducing the pilot fuel. In this way, it is possible to enable NOx reduction operation.

As a result, in a case where the gas engine has a combustion-chamber structure of a pilot injection type, it is possible to obtain the effect to reduce NOx efficiently by switching to the low NOx operation mode and performing the NOx reduction operation temporarily.

Advantageous Effects

According to the present invention, it is possible to reduce NOx and improve fuel consumption by continuing and canceling the NOx restriction operation to switch the operation mode between NOx restriction operation and stable operation focusing on the fuel consumption, on the basis of occurrence condition of environmental conditions or geographical conditions in which it is necessary to restrict the amount of NOx emission temporarily.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

First Embodiment

Figure 1:
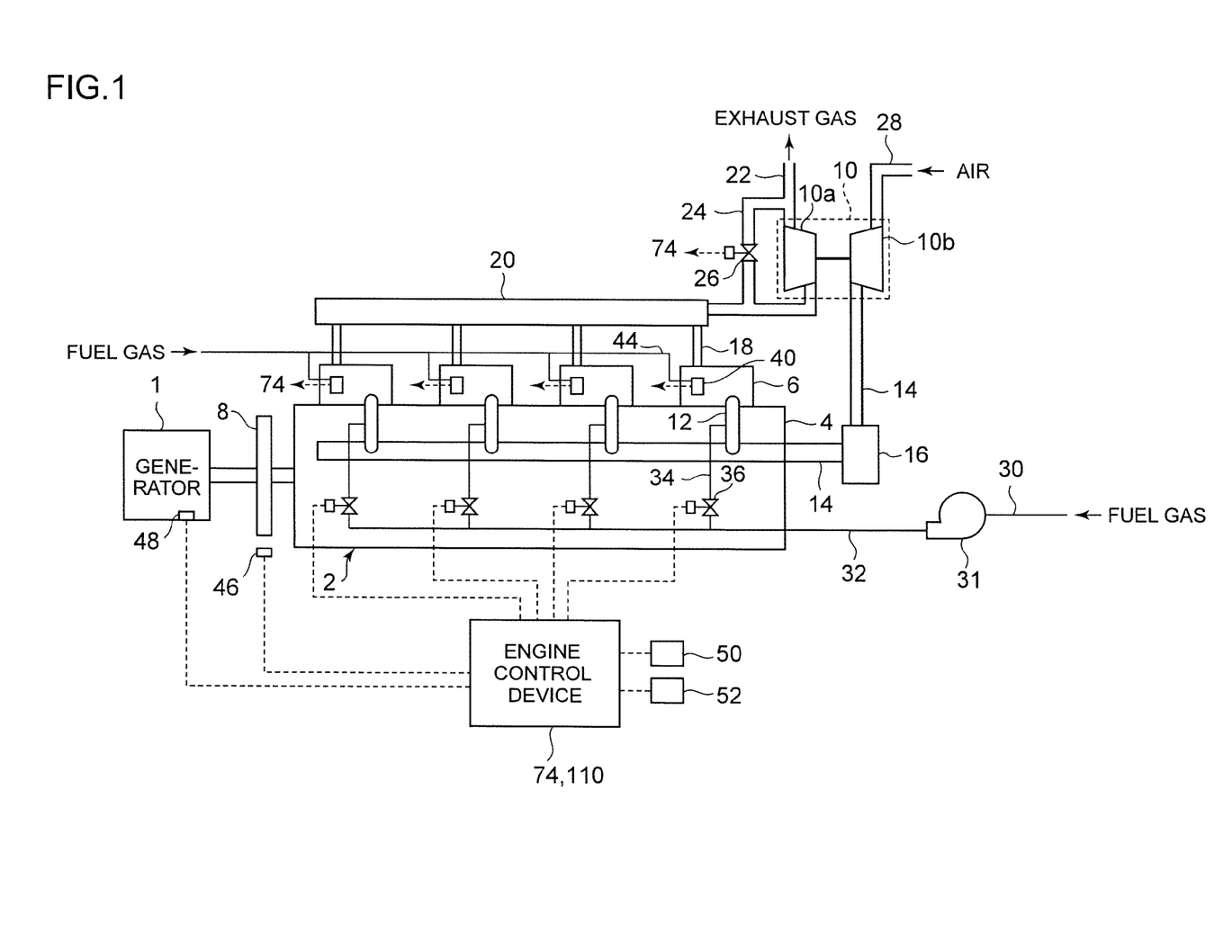
FIG. 1 is a system diagram of an overall configuration of a gas engine including an exhaust-gas control device according to the first embodiment of the present invention.
Figure 2:
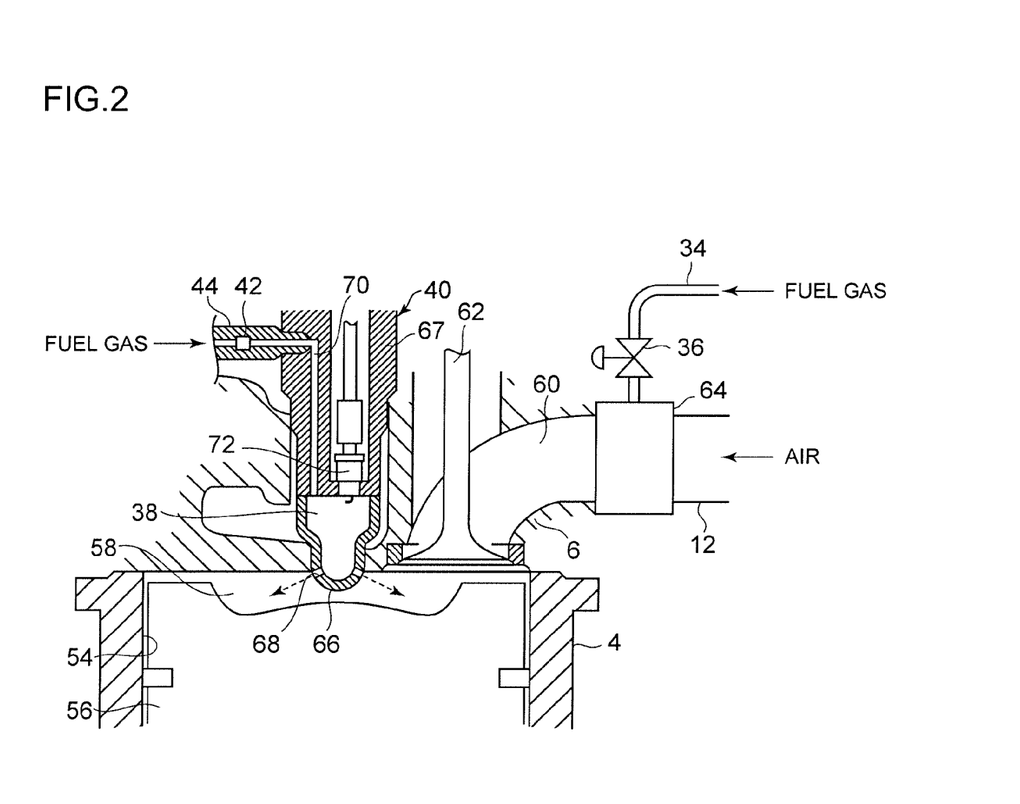
FIG. 2 is a partial explanatory cross-sectional view of a peripheral structure of a combustion chamber of the first embodiment.

FIG. 1 is an overall configuration diagram of a gas engine system according to the first embodiment of the present invention. FIG. 2 is a partial cross-sectional view of a combustion chamber and its peripheral structure. Described as an example in the present embodiment is a gas engine equipped with a turbocharger for driving a generator, the gas engine including a precombustion chamber for ignition.

The present invention is not limited to the gas engine of the present embodiment, and can be applied to a gas engine of a combustion method according to the second embodiment described below. Further, while an object that is to be driven is preferably a generator 1, the present invention can be applied to a case where the object is not a generator.

In FIG. 1, an engine (gas engine) 2 includes a cylinder block 4, cylinder heads 6, a flywheel 8, and a turbocharger 10 including an exhaust turbine 10a and a compressor 10b. Further, a generator 1 is directly mounted to the flywheel 8.

A supply-air branch pipe 12 is connected to an air-supply inlet of each of the cylinder heads 6. Each supply-air branch pipe 12 is connected a supply-air outlet of the compressor 10b via a supply-air pipe 14. A supply-air cooler 16 for cooling supply air flowing through the supply-air pipe 14 is disposed in the supply-air pipe 14.

On the other hand, an exhaust pipe 18 is connected to an exhaust outlet of each cylinder head 6. Each exhaust pipe 18 is connected to an exhaust inlet of the exhaust turbine 10a via an exhaust collecting pipe 20. An exhaust outlet pipe 22 for discharging exhaust gas is connected to an exhaust-gas outlet of the exhaust turbine 10a.

Further, a waste gate pipe 24 is branched from the exhaust collecting pipe 20 at the inlet side of the exhaust turbine 10a to bypass the exhaust turbine 10a, and connected to the exhaust outlet pipe 22 at the outlet side of the exhaust turbine 10a. A waste gate valve 26 is disposed in the waste gate pipe 24. The waste gate valve 26 varies a channel area of the waste gate pipe 24 to adjust a turbocharging pressure of the compressor 10b.

A turbocharger-inlet air channel 28 for introducing air from the outside is connected to the compressor 10b of the turbocharger 10. Fuel gas is introduced into a gas supply pipe 30 from a fuel gas tank (not illustrated) storing the fuel gas. The gas supply pipe 30 is connected to a gas supply main pipe 32, and the gas supply main pipe 32 is branched at the middle into gas supply branch pipes 34 for the respective cylinders to be connected to the respective supply-air branch pipes 12. Further, the fuel gas is compressed and fed to the gas supply main pipe 12 by a gas compressor 31.

Each gas supply branch pipe 34 includes a fuel flow-rate control valve 36 for controlling a channel area of the corresponding gas supply branch pipe 34, which is the flow rate of the fuel gas.

Further, a precombustion-chamber fuel gas supply pipe 44 is connected to each cylinder head 6. Each precombustion-chamber fuel gas supply pipe 44 supplies fuel gas to an ignition device 40 including a precombustion chamber 38 via a check valve 42.

An engine speed sensor 46 for detecting an engine speed and a load sensor 48 for detecting the load of the generator 1, which is an engine load, are provided. Further, a thermometer 50 for measuring the ambient-air temperature and a humidity sensor 52 for measuring the relative humidity of the ambient air are disposed.

FIG. 2 is a partial explanatory cross-sectional view of a combustion chamber and its peripheral structure of the engine 2 illustrated in FIG. 1. A piston 56 that is reciprocably fitted in a cylinder 54, a main combustion chamber 58 defined and formed between an upper surface of the piston 56 and an inner surface of the cylinder block 4, an intake port 60 connected to the main combustion chamber 58, and an intake valve 62 for opening and closing the intake port 60, are provided.

A gas mixer 64 is disposed in the air-supply branch pipe 12 at the upstream side of the intake port 60 and the gas supply branch pipe 34 is connected to the gas mixer 64, so that fuel gas supplied through the gas supply branch pipe 34 and air supplied through the supply-air branch pipe 12 are pre-mixed in the gas mixer 64. The gas supply branch pipe 34 may be connected to the intake-air branch pipe 12 directly and the gas and the air may be mixed without involving the gas mixer 64.

Then, the mixed gas passes through the intake port 60 to arrive at the intake valve 62, and is supplied to the main combustion chamber 58 as the intake valve 62 opens.

Further, a precombustion chamber 38 is formed inside a precombustion-chamber cap 66. A plurality of nozzles 68 is formed around a tip portion of the precombustion-chamber cap 66. The nozzles 68 inject flames into the main combustion chamber 58 to perform main combustion.

The precombustion-chamber cap 66 is mounted to a tip portion of a nozzle holder 67. A precombustion-chamber fuel gas channel 70 and a spark plug 72 are disposed inside the nozzle holder 67. The spark plug 72 ignites fuel gas supplied from the combustion-chamber fuel gas channel 70 to the precombustion chamber 38. A precombustion-chamber fuel gas supply pipe 44 is connected to the precombustion-chamber fuel gas channel 70, and fuel gas is supplied to the precombustion chamber 38 via the check valve 42. Pressurized fuel gas is supplied from the upstream side of the check valve 42 in accordance with the ignition timing of the spark plug 72.

Next, an engine control device 74 for a gas engine with the above configuration will be described.

Figure 3:
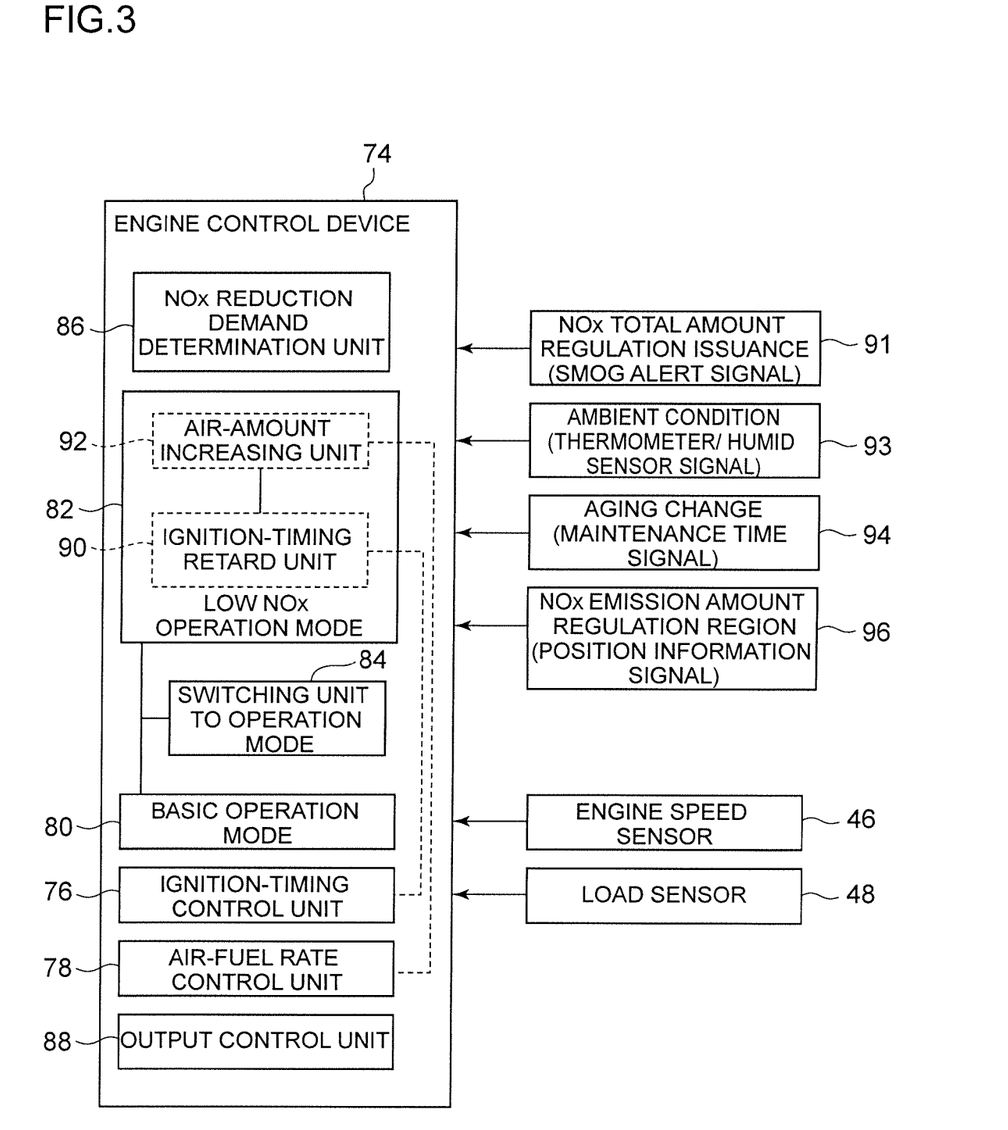
FIG. 3 is a configuration block diagram of an engine control device.

As illustrated in FIG. 3, the engine control device 74 includes an ignition-timing control unit 76, an air-fuel rate control unit 78, an switching unit to operation mode 84, a NOx reduction demand determination unit 86, and an output control unit 88. The ignition-timing control unit 76 mainly controls the ignition timing of the spark plug 72 to ignite fuel gas supplied into the precombustion chamber 38, thereby controlling the ignition timing of the mixed air in the main combustion chamber 58. The air-fuel rate control unit 78 controls the air-fuel rate in the main combustion chamber 58. The switching unit to operation mode 84 switches the operation mode between a basic operation mode 80 and a low NOx operation mode 82. The NOx reduction demand determination unit 86 determines whether it is necessary to restrict the amount of NOx emission temporarily on the basis of at least one of an environmental condition, a geographical condition or an engine operation elapse condition. The output control unit 88 controls the engine output, i.e., the output power of the generator 1.

The basic operation mode 80 is operation in which the ignition-timing control unit 76 and the air-fuel rate control unit 78 are controlled on the basis of signals of the engine speed and the engine load detected by the engine speed sensor 46 and the load sensor 48, with target values which are a target air-fuel rate (the first target air-fuel rate) and a target ignition timing (the first target ignition timing) calculated using a table of a map of the target air-fuel rate (the first target air-fuel rate) and the target ignition timing (the first target ignition timing) which are optimum, i.e., at which the fuel consumption rate reaches the best, with respect to the predetermined engine speed and engine load.

On the other hand, the low NOx operation mode 82 is operation in which the ignition-timing control unit and the air-fuel rate control unit are controlled with target values which are the second target ignition timing retarded from the first target ignition timing by a predetermined amount and the second target air-fuel rate increased from the first target air-fuel rate by a predetermined amount.

Specifically, the low NOx operation mode 82 includes an ignition-timing retard unit 90 which retards from the first target ignition timing with good fuel consumption rate to the second target ignition timing, and an air-amount increasing unit 92 which increases the amount of air from the first target air-fuel rate with good fuel consumption to the second target air-fuel rate. The ignition timing retard unit 90 controls the ignition timing of the spark plug 72 to retard. Further, the air-amount increasing unit 92 increases the amount of turbocharge by reducing the opening degree of the waste gate valve 26 of the turbocharger 10.

Further, the NOx reduction demand determination unit 86 determines the necessity to restrict the amount of NOx emission temporarily such as an environmental condition, a geographical condition and an engine operation elapse condition.

For the engine 2, operation conditions (e.g. the first target ignition timing and the first target air-fuel rate) are set at the optimum fuel consumption after taking basic measures for exhaust gas to satisfy the exhaust-gas regulation value.

However, if the gas engine is operated under conditions in which NOx is addressed by further sacrificing the fuel consumption in response to a change in the environment, an operation period, or special NOx exhaust-gas regulations, the fuel consumption may be further deteriorated, which is not economically efficient.

Thus, the NOx reduction demand determination unit 86 determines whether the necessity to address an environmental change, an operation period, or special NOx exhaust-gas regulations has arisen.

The conditions determined by the NOx reduction demand determination unit 86 are as follows.

For instance, as a determination condition (the first condition), the NOx reduction demand determination unit 86 determines that NOx reduction is necessary if a smog alert is issued in a region where the engine 2 is installed or in its periphery.

A smog alert is frequently issued during summer in an urban area. Further, an amount of power generation is generally required at power generation facilities in summer. Thus, when photochemical smog occurs in summer, it is necessary to restrict the amount of NOx emission in operation of an engine while maintaining the amount of power generation of a generator at a constant rate. In this case, the low NOx operation mode 82 for NOx reduction is adopted even if deterioration of the fuel consumption is to be involved.

For a gas engine for power generation installed in suburbs of an urban area in particular, the low NOx operation mode 82 is effective in appropriately operating the gas engine taking account of a relationship between the increased-output operation during summer and the NOx reduction operation in view of a decrease in fuel consumption.

When volatile organic compound contained in paint or adhesive agent as a medium and NOx (nitrogen oxide) contained in exhaust gas emitted from a vehicle or a factory receive ultraviolet from the sun to cause chemical reaction, a new substance called photochemical oxidant is produced. On a day when the temperature is high, wind is weak, and the sunlight is strong, the concentration of the photochemical oxidant in the atmospheric air increases and so-called photochemical smog is produced.

Thus, if a photochemical smog alert is issued, it is possible to achieve the effect to reduce NOx efficiently by temporarily switching to the low NOx operation mode and performing the NOx reduction operation to reduce the amount of NOx emission, which is the cause of production of the photochemical smog.

Further, as a determination condition (the second condition), the NOx reduction demand determination unit 86 also determines that NOx reduction is necessary if the ambient temperature at which the engine 2 is installed is a predetermined value or more and the humidity is a predetermined value or less, which is a high-temperature and low-humidity state.

In a high-temperature and low-humidity state in which the ambient temperature is a predetermined value or more and the humidity is a predetermined value or less, the temperature of the supply air increases and the combustion temperature in the main combustion chamber 58 also tends to increase, and thus NOx is likely to be produced. Thus, it is possible to obtain the effect to reduce NOx efficiently by switching to the low NOx operation mode and performing the NOx reduction operation temporarily.

Here, as a condition of a high temperature and a low humidity, for instance, the temperature is 30° C. or more and the relative humidity is 40% or less.

Further, as a determination condition (the third condition), the NOx reduction demand determination unit 86 determines that NOx reduction is necessary when a predetermined time before the next maintenance time or a predetermined time after a start of the first operation has passed on the basis of operation time data of the gas engine.

The engine 2 is a gas engine for power generation and undergoes maintenance regularly for replacement of parts, for instance, in response to deterioration due to aging. Immediately before the maintenance time, however, the engine would have been operated for a long period of time and the exhaust gas condition would tend to deteriorate.

At such a time, it is possible to obtain the effect to reduce NOx efficiently by switching the operation mode to the low NOx operation mode and performing the NOx reduction operation temporarily. Further, independently from the regular maintenance time, the exhaust gas condition tends to deteriorate when a predetermined time has passed after the start of the first operation. Thus, at such a time, switching to the low NOx operation mode and performing NOx reduction operation is efficient in terms of NOx reduction.

Further, as a determination condition (the fourth condition), in a case where the engine 2 is used as a main engine of a vehicle, a ship, or an air plane, or a case where the engine 2 is used as a power source for a generator mounted to the vehicle, the ship, or the airplane, the NOx reduction demand determination unit 86 determines that NOx reduction is necessary when a moving body such as the vehicle, the ship, and the airplane approaches or enters a regulation area of the amount of NOx emission, e.g. when the moving body moves into a nation (territorial sea or air) having a different exhaust-gas regulation value or to a special region in the same nation where the regulation is strict.

Specifically, a detection result of the position information is compared to pre-stored data of the levels of the NOx regulation values of worldwide regions (including air and sea area), and the NOx reduction is determined to be necessary when entering such region.

Here, the NOx reduction level may be varied between the time of approach and the time of entry so that NOx reduction is executed in stages, executing the first-stage NOx reduction at the time of approach within a predetermined distance and executing further NOx reduction at the stage of entry into the region.

In this way, it is possible to apply the present embodiment to a moving body which moves to a region having a different NOx regulation value.

Further, the above determination conditions of the NOx reduction demand determination unit 86 may be suitably combined to determine the reduction demand even more precisely. For instance, it is determined that NOx reduction is even more necessary by combining the first condition of issuance of a photochemical smog alert and the second condition of the high-temperature and low-humidity state of the ambient-air condition.

Further, a combination of the second condition of the high-temperature and the low-humidity state of the ambient-air condition and the third condition of the time immediately before the maintenance time, and a combination of the third condition of the time immediately before the maintenance time and the fourth condition of approach or entry to the regulation region of the amount of NOx emission are especially effective.

When it is determined that reduction is necessary by the NOx reduction demand determination unit 86, the switching unit to operation mode 84 of the engine control device 74 switches the operation mode from the basic operation mode 80 to the low NOx operation mode 82. When it is determined that reduction is not necessary, the switching unit to operation mode 84 maintains the operation mode if the operation mode is the basic operation mode 80, and switches the operation to return to the basic operation mode 80 if the operation mode is the low NOx operation mode 82.

Further, the output control unit 88 maintains the output power of the generator 1 at a constant rate by maintaining the engine output, i.e., the engine speed at a constant rate. During operation of the low NOx operation mode 82, the ignition timing is retarded and the amount of air is increased, but the retard angle of the ignition timing, the amount of air increase, and the amount of fuel gas are controlled so that the engine output does not change considerably.

Figure 4:
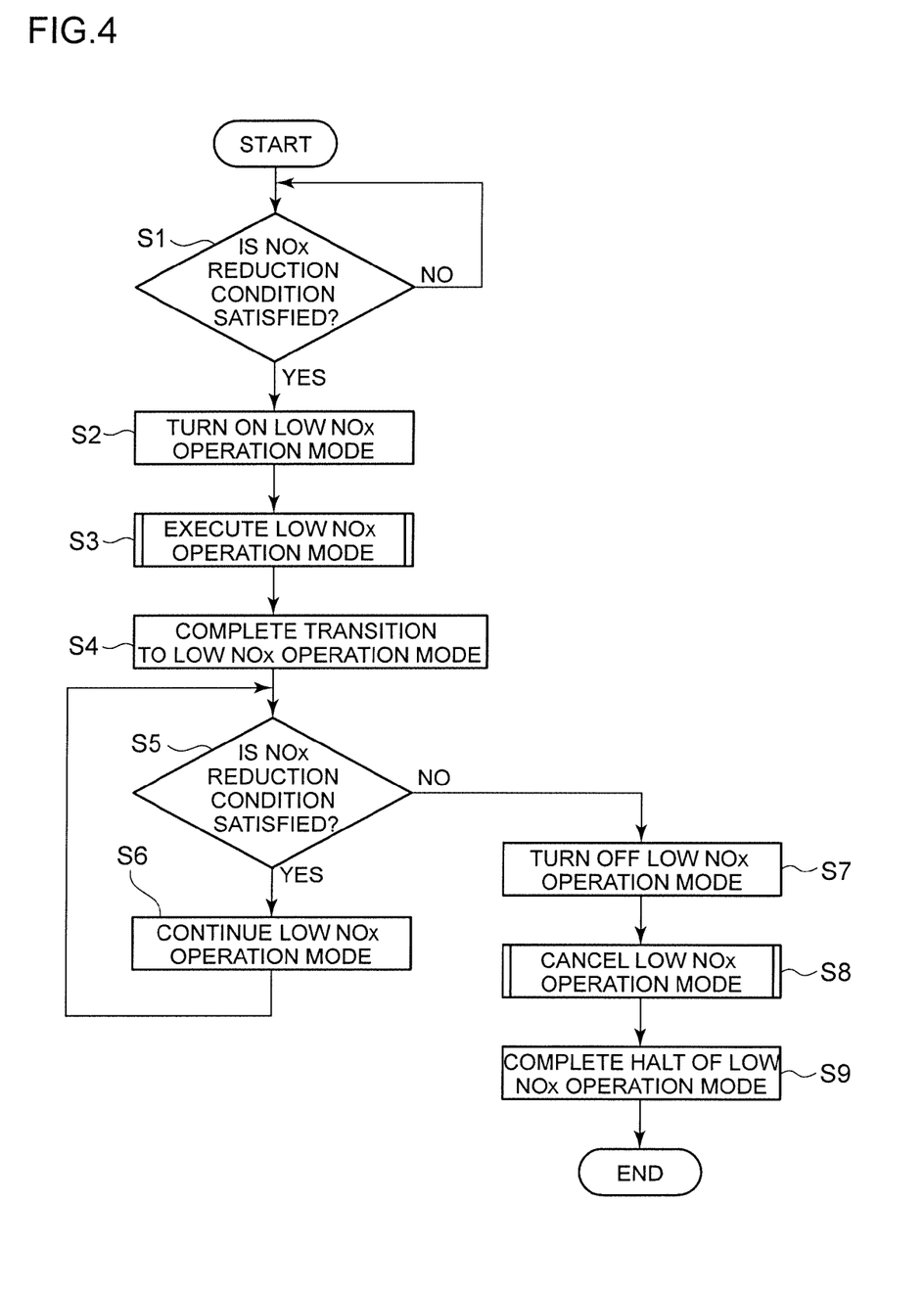
FIG. 4 is a control flow chart of an engine control device.

Next, with reference to the flowchart of FIG. 4, the control flow of the engine control device 74 will be described.

After the operation is started, it is determined whether the NOx reduction condition is met in step S1. The determination is performed by the NOx reduction demand determination unit 86 on the basis of whether a NOx total amount regulation issuance signal (photochemical smog issuance signal) 91 is issued, or on the basis of an ambient-air condition signal (a signal determining a predetermined high-temperature and low-humidity state from detection signals from the thermometer 50 and the humidity sensor 52) 93.

Further, determination is performed on the basis of a time-series change signal (a signal indicating having a predetermined time before the maintenance time from information of a maintenance-time signal, or passage of a predetermined time after the start of operation) 94.

Still further, determination is performed by determining approach or entry to a regulation region of the amount of NOx emission on the basis of a NOx emission amount regulation region signal (position information signal) 96.

The determination in step S1 is repeated until the NOx reduction condition is met. If the NOx reduction is met, the process advances to step S2 and the low NOx operation mode is turned ON by the switching unit to operation mode 84. Then, the process advances to step S3 and the low NOx operation mode is executed.

Figure 5:
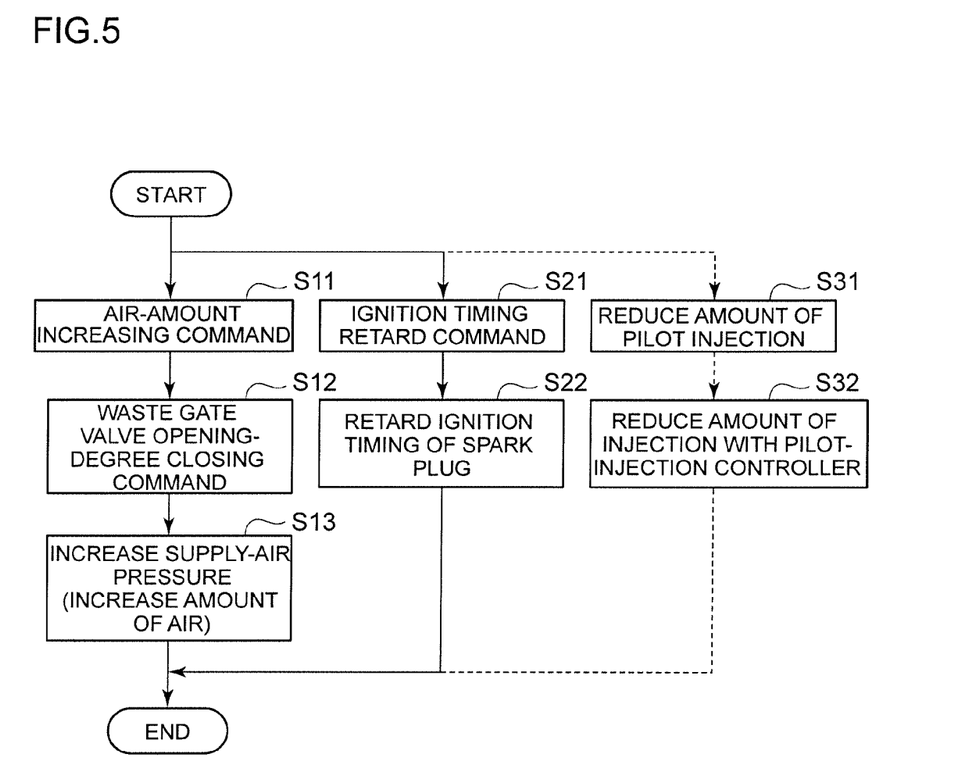
FIG. 5 is a flowchart of a subroutine of low-NOx mode operation.

The low NOx operation mode is executed according to the flow of the subroutine illustrated in FIG. 5. In step S4, the transition to the low NOx operation mode is completed by executing the flow illustrated in FIG. 5.

Next, the process advances to step S5 and it is determined whether the NOx reduction condition is met, similarly to step S1. If the determination result is Yes, the process advances to step S6 and the low NOx operation mode 82 is continued and repeated until the NOx reduction condition becomes non-satisfied. Then, when the NOx reduction condition is not satisfied, the process advances to step S7 and the low NOx operation mode 82 is turned OFF. Subsequently, in step S8, the low NOx operation mode is canceled. In the cancellation of the low NOx operation mode, the subroutine illustrated in FIG. 5 is executed in a reversed order, changing the air-amount command value to a reduced side and the ignition timing to an advanced side.

Then, in step S9, the flow illustrated in FIG. 5 is executed in a reversed order to complete halt of the low NOx operation mode, returning the operation mode to the basic operation mode 80.

In the subroutine of the low NOx operation mode illustrated in FIG. 5, the air-amount increasing unit 92 is commanded to increase the amount of air in step S11 at first, and then the opening degree of the waste gate valve 26 is operated toward a closing direction to increase the supply-air pressure (to increase the amount of supply-air) in step S12. Simultaneously, in step S21, a retard command is sent to the ignition timing retard unit 90 to retard to the ignition timing of the spark plug 72 in step S22.

Figure 6:
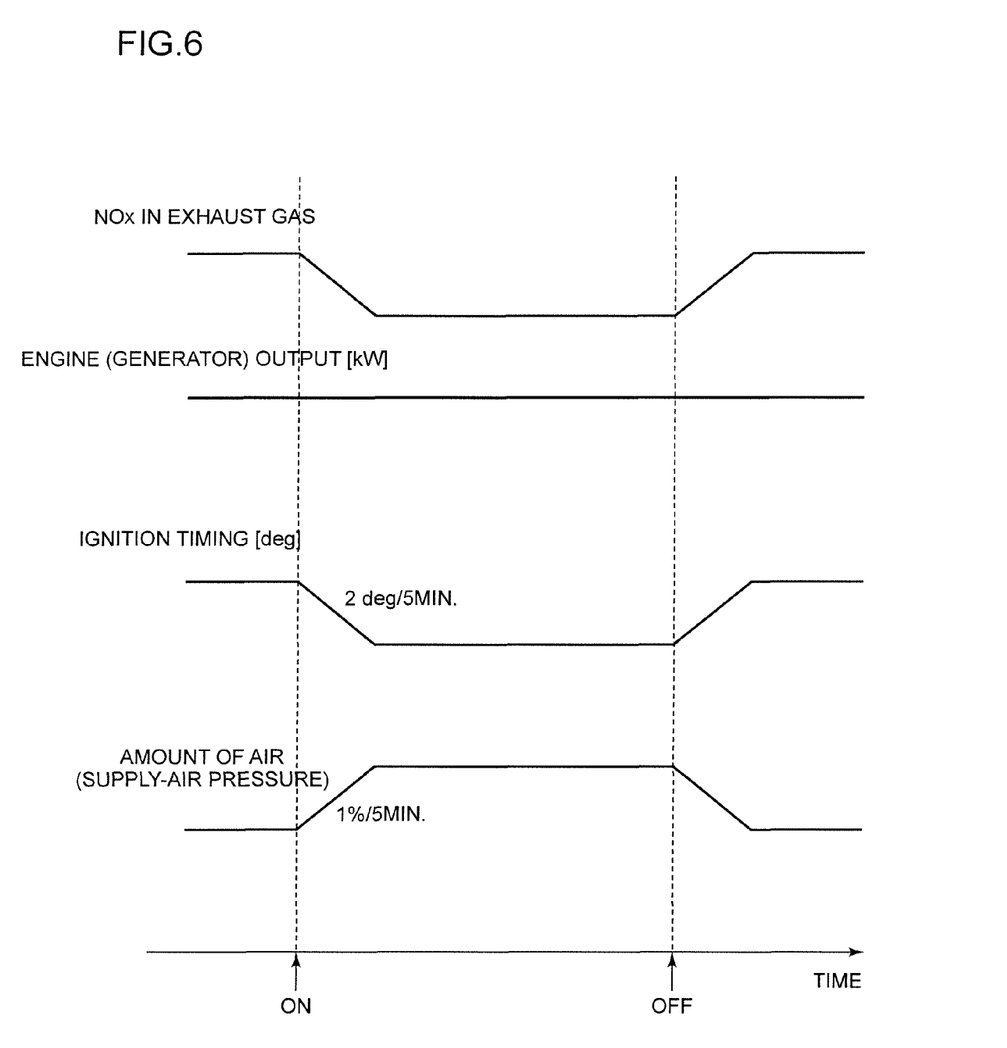
FIG. 6 is a time chart of the NOx concentration, the engine output, the ignition timing, and the amount of air during the low-NOx mode operation.

Illustrated in FIG. 6 is a time chart in the low NOx operation mode 82 of the above engine control device 74. The time chart shows NOx concentration in the exhaust gas, an engine output (generator output), retard of the ignition timing, and an increase in the amount of air from ON to OFF of the low NOx operation mode 82.

In a case of transition to the low NOx operation mode 82, for instance, the ignition timing is retarded at a rate of 2 deg/5 minutes, and the amount of air is increased at a rate of 1%/5 minutes. The engine output is controlled to be maintained at a substantially constant rate. Further, also in a case of return to the basic operation mode 80, similarly to the transition to the low NOx operation mode 82, the switch is performed by returning the amount of air and the ignition timing at the same rate from the time of OFF.

According to the above first embodiment, only when the need to restrict the amount of NOx emission temporarily arises due to an environmental condition such as a temperature and a humidity, a geographical condition, an engine-operation elapse condition or the like, the switching unit to operation mode 84 switches the operation mode from the basic operation mode 80 to the low NOx operation mode 82, so that the air-fuel rate control unit 78 performs control on the basis of the second target air-fuel rate increased from the first target excess rate, and the ignition-timing control unit 76 performs control based on the second target ignition timing retarded from the first target ignition timing.

Accordingly, it is possible to obtain an exhaust gas control device for a gas engine whereby it is not necessary to increase the target air-fuel rate and retard the ignition timing continuously to perform NOx reduction operation, and stable operation focusing on the fuel consumption is performed by the basic operation mode 80 when the NOx reduction operation is not needed, so that NOx is reduced and the fuel consumption is improved.

Second Embodiment

Figure 7:
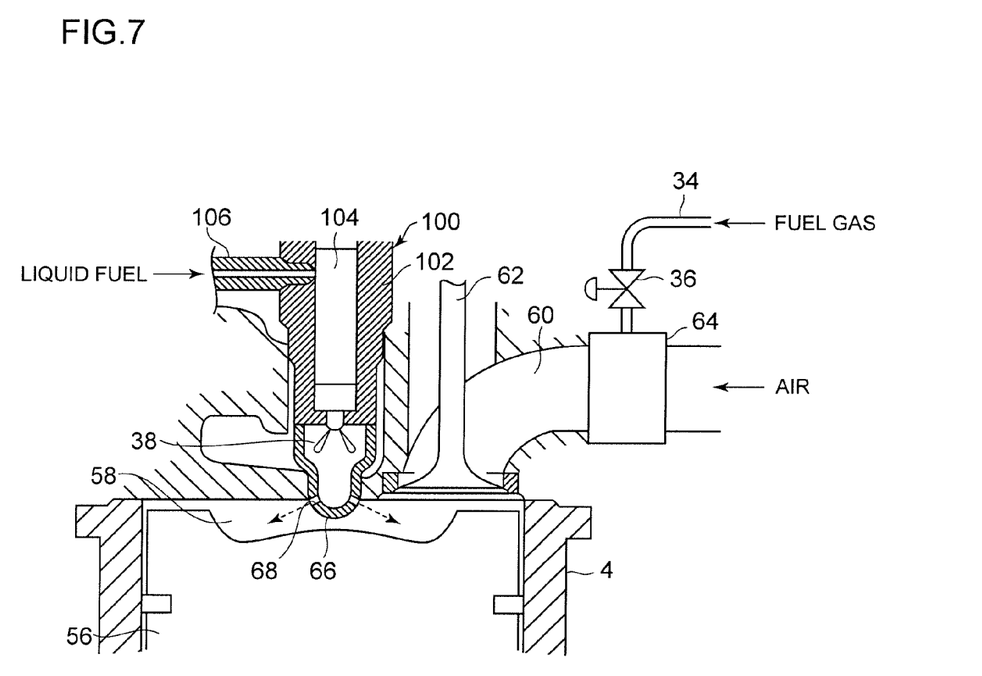
FIG. 7 is a partial explanatory cross-sectional view of a combustion chamber and its peripheral structure according to the second embodiment of the present invention.
Figure 8:
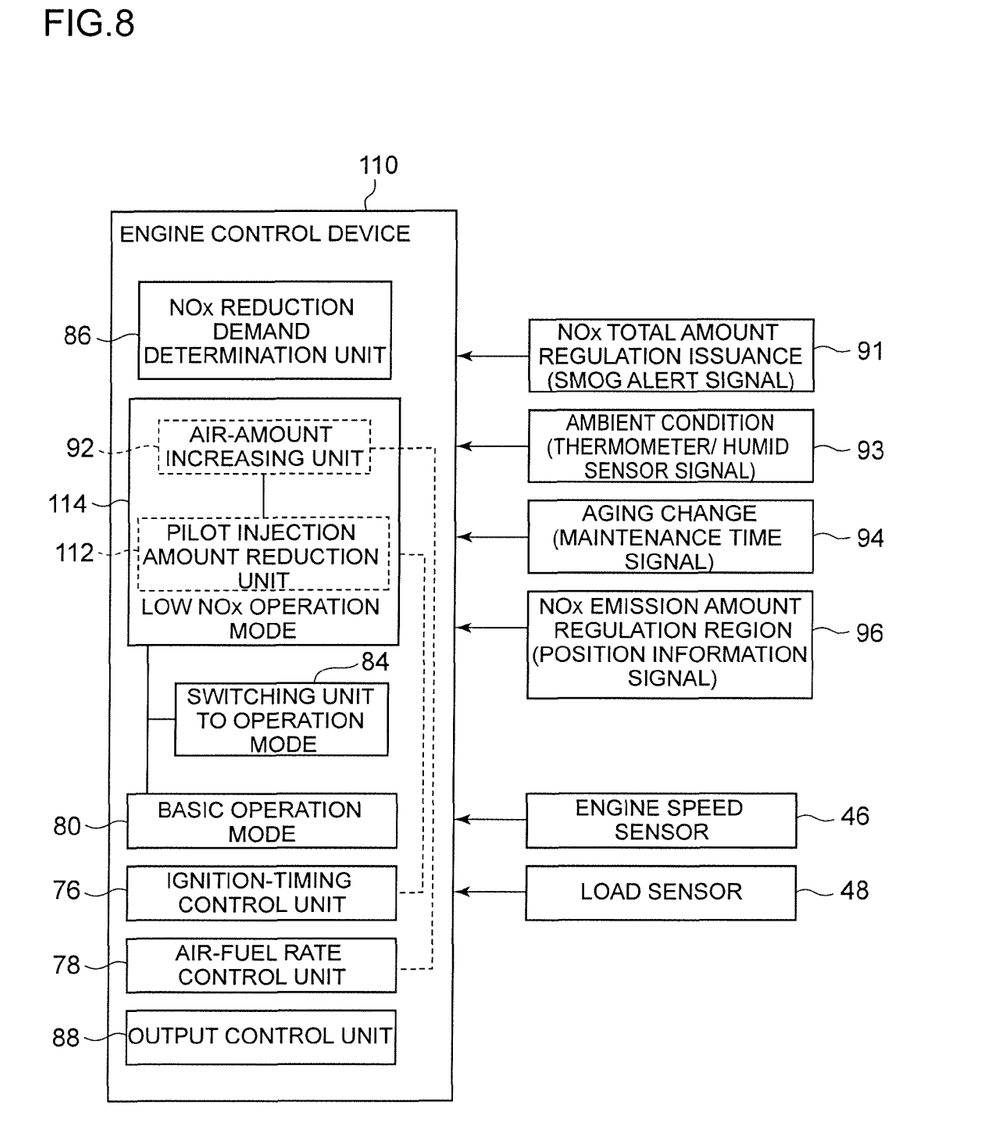
FIG. 8 is a configuration block diagram of an engine control device of the second embodiment.

With reference to FIGS. 5, 7, and 8, the second embodiment will be described.

The second embodiment is different from the first embodiment only in the combustion method. The second embodiment has a micro-pilot type precombustion-chamber structure instead of the ignition-plug type precombustion-chamber structure of the first embodiment. The other configuration is similar to that of the first embodiment, and the same feature is indicated by the same reference numeral and not described in detail.

As illustrated in FIG. 7, the ignition device 100 includes the precombustion chamber 38 formed inside the precombustion-chamber cap 66 mounted to a tip end portion of a nozzle holder 102. A fuel-injection valve 104 is disposed inside the nozzle holder 102. Liquid fuel (light oil) is supplied to the fuel injection valve 104 from an inlet pipe 106 of the liquid fuel.

Then, the premix mixed gas introduced into the main combustion chamber 58 via the intake valve 62 in the intake stroke is introduced into the precombustion chamber 38 through the nozzles 68 formed on the tip end portion of the precombustion-chamber cap 66 from the main combustion chamber 58 in the compression stroke. The liquid fuel is pilot-injected into the mixed gas from the fuel injection valve 104 to be combusted, and ignition flame generated by the combustion passes through the nozzles 68 to be circulated and injected into the main combustion chamber 58, so that the premix mixed gas in the main combustion chamber 58 is combusted.

As indicated by the dotted line in FIG. 5, the engine control device 110 according to the above second embodiment includes reduction of the amount of pilot injection in addition to the first embodiment. In the low NOx operation mode 114, a pilot-injection amount reduction unit 112 reduces the amount of fuel for pilot injection, so as to weaken the flame strength of the ignition flame and reduce the combustion temperature in the main combustion chamber 58, thereby reducing the amount of NOx generation. As illustrated in the flowchart of FIG. 5, to execute the low NOx operation mode 114, a command is issued to reduce the amount of pilot injection in step S31, and a pilot-injection controller (not illustrated) reduces the amount of injection in step S32.

Here, in the second embodiment, retard of the ignition timing of the spark plug in steps S21, S22 in FIG. 5 is read as retard of the injection timing of the pilot injection.

Also in the micro-pilot type precombustion-chamber structure of the second embodiment, similarly to the first embodiment, it is possible to obtain an exhaust-gas control device whereby it is not necessary to continuously increase the target air-fuel rate and retard the ignition timing as well to perform NOx reduction operation, and stable operation is performed in the basic operation mode 80 focusing on fuel consumption when it is not necessary to perform NOx reduction operation, so that NOx is reduced and fuel consumption is improved.

Further, while a combustion-chamber structure having a precombustion-chamber structure is described in the second embodiment, a direct-injection type structure may be employed in which the pilot fuel (liquid fuel) is directly injected into the main combustion chamber.

In the first and second embodiments, as illustrated in FIG. 1, the fuel gas is introduced from the fuel gas tank (not illustrated) into the gas supply pipe 30, and the gas supply pipe 30 is connected to the gas supply main pipe 32, which is branched for the respective cylinders into the gas supply branch pipes 34 to be connected to the respective supply-air branch pipes 12. However, the fuel gas may not be necessarily supplied to each supply-air branch pipe 12 to produce premix mixed gas. Instead, a gas mixer 116 may be disposed on the upstream side of the compressor 10b of the turbocharger 10 to produce premix mixed gas by supplying fuel gas via a gas adjustment valve 118, or further, the gas may be mixed both in the supply-air branch pipes 12 and at the upstream side of the turbocharger 10 as illustrated in FIG. 9.

Figure 9:
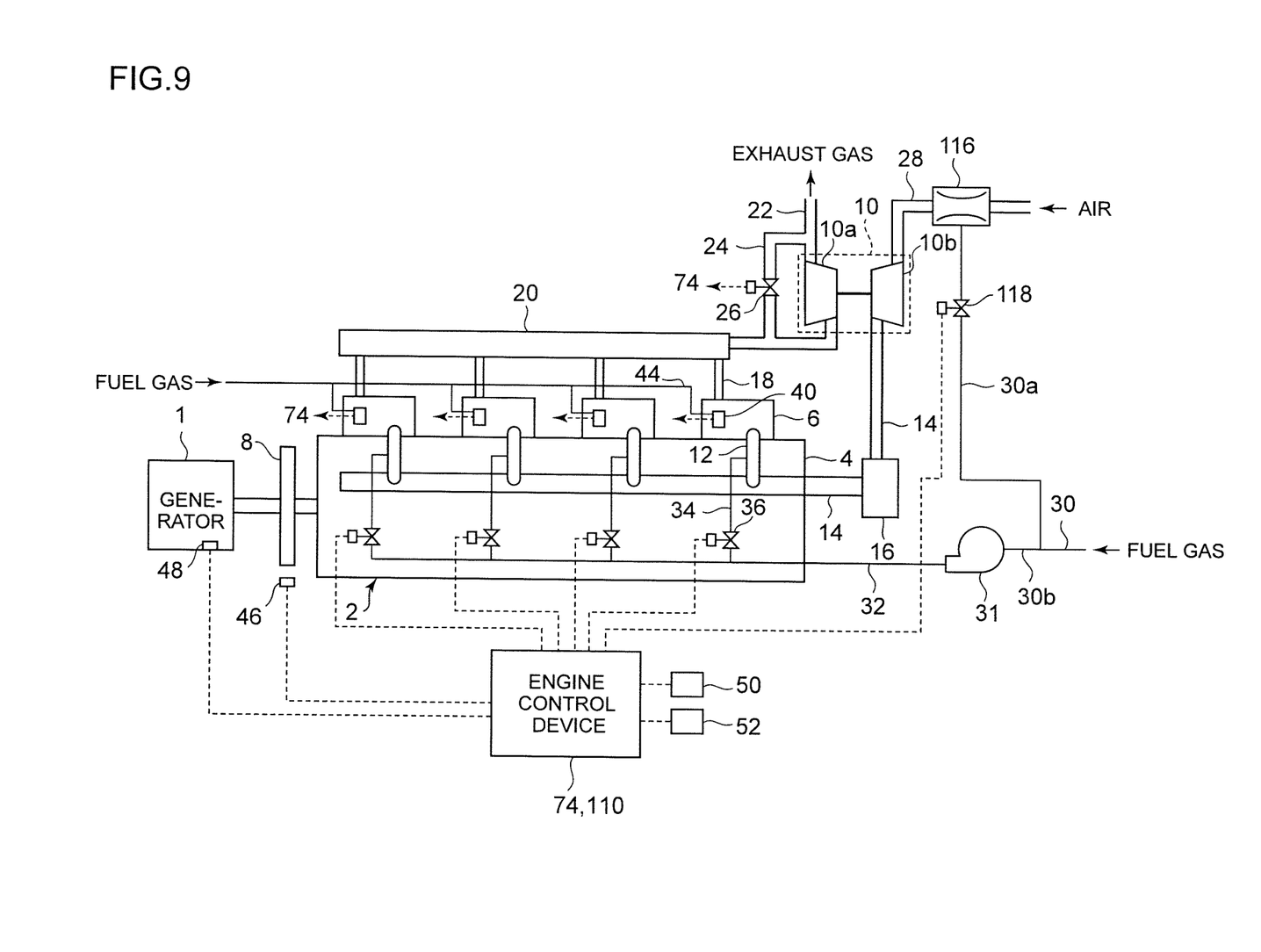
FIG. 9 is a variant of the first and second embodiments.

As illustrated in FIG. 9, the gas supply pipe 30 for introducing fuel gas from a fuel gas tank (not illustrated) is branched into a turbocharger-side gas supply pipe 30a and a cylinder-side gas supply pipe 30b, and the turbocharger-side gas supply pipe 30a is connected to the gas mixer 116. The amount of fuel gas adjusted by the gas adjustment valve 118 is premixed with the air. Further, as the gas mixer 116, a venturi mixer is preferably used.

INDUSTRIAL APPLICABILITY

According to the present invention, it is possible to reduce NOx and improve fuel consumption by performing NOx restriction operation when environmental conditions or geographical conditions which require temporary restriction of the amount of NOx emission are satisfied, and otherwise performing stable operation focusing on the fuel consumption. Thus, the present invention can be suitably applied to a gas engine for power generation or a gas engine mounted to a moving body.

DESCRIPTION OF REFERENCE NUMERALS

1 Generator
2 Engine (Gas engine)
4 Cylinder block
6 Cylinder head
8 Flywheel
10 Turbocharger
10a Exhaust turbine
10b Compressor
26 Waste gate valve
38 Precombustion chamber
46 Engine speed sensor
48 Load sensor
50 Thermometer
52 Humidity sensor
58 Main combustion chamber (combustion chamber)
74, 110 Engine control device (Exhaust-gas control device)
76 Ignition-timing control unit
78 Air-fuel rate control unit
80 Basic operation mode
82 Low NOx operation mode
84 Switching unit to operation mode
86 NOx reduction demand determination unit
88 Output control unit
90 Ignition timing retard unit
91 NOx total amount regulation issuance signal
92 Air amount increasing unit
93 Ambient-air condition signal 94 Time-series change signal
96 NOx emission amount regulation region signal
112 Pilot-injection amount reduction unit

The invention claimed is:

1. An exhaust-gas control method for a gas engine, which mixes fuel gas and air and supplies mixed gas to a combustion chamber, comprising:
  executing a basic operation mode in which an ignition-timing of the mixed gas and an air-fuel rate in the combustion chamber are respectively controlled to be a first target ignition timing and a first target air-fuel rate which are respectively set as an ignition timing and an air-fuel rate at which a fuel consumption rate is the best on the basis of an engine speed and an engine load;
  determining whether there is a NOx reduction demand to restrict an amount of NOx emission temporarily, on the basis of at least one of a geographical condition of a region where the amount of NOx emission is regulated, or an engine operation elapse condition;
  switching an operation mode from the basic operation mode to a low NOx operation mode in which the ignition-timing and the air-fuel rate are respectively controlled to be a second target ignition timing retarded from the first target ignition timing and a second target air-fuel rate increased from the first target air-fuel rate as target values;
  continuing the low NOx operation mode until a NOx reduction demand is cancelled; and
  switching the operation mode from the low NOx operation mode to the basic operation mode when the NOx reduction demand is cancelled.

2. The exhaust-gas control method for a gas engine according to claim 1, wherein the NOx reduction demand incorporates a high-temperature and low-humidity condition that an ambient temperature in which the gas engine is installed is a predetermined value or more and a humidity is a predetermined value or less.

3. The exhaust-gas control method for a gas engine according to claim 1, wherein the NOx reduction demand is determined that there is a necessity when a predetermined period before a next maintenance time elapses, or a predetermined period after a start of first operation elapses, on the basis of operation-time data of the gas engine.

4. The exhaust-gas control method for a gas engine according to claim 1, wherein the NOx reduction demand is determined that there is a necessity when a moving body equipped with the gas engine enters a region where the amount of NOx emission is regulated.

5. The exhaust-gas control method for a gas engine according to claim 1, wherein the gas engine includes a turbocharger, and the air-fuel rate is increased by controlling the turbocharger in the low NOx operation mode.

6. The exhaust-gas control method for a gas engine according to claim 1, wherein the gas engine has a pilot-injection combustion-chamber structure, and the air-fuel rate is increased in the low NOx operation mode by reducing pilot fuel which is injected into a precombustion chamber or a main chamber.

* * * * *